(No Model.)
R. A. JOHNSON.
HAND SEED PLANTER AND FERTILIZER DISTRIBUTER.
No. 287,132. Patented Oct. 23, 1883.
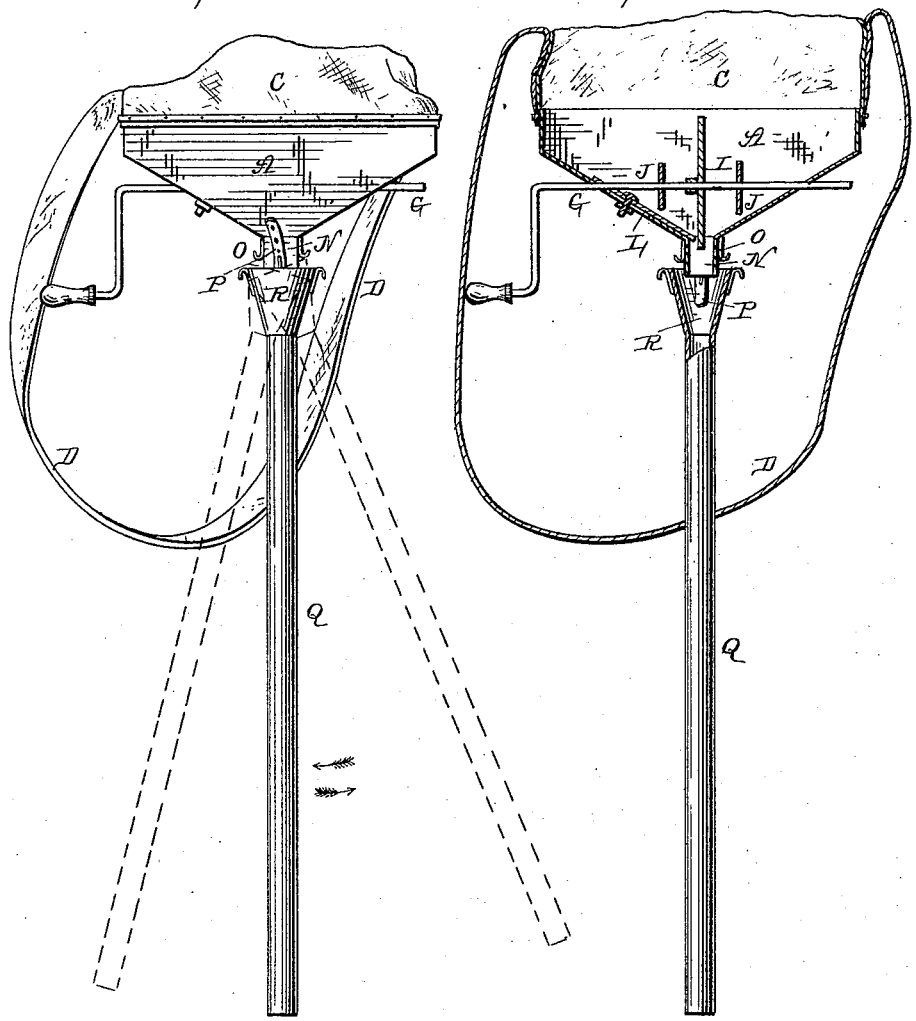
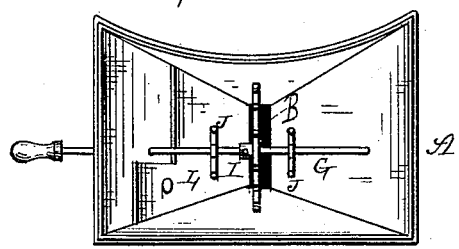

UNITED STATES PATENT OFFICE.

RICHARD A. JOHNSON, OF NEWNAN, GEORGIA.

HAND SEED-PLANTER AND FERTILIZER-DISTRIBUTER.

SPECIFICATION forming part of Letters Patent No. 287,132, dated October 23, 1883.

Application filed July 10, 1883. (No model.)

*To all whom it may concern:*

Be it known that I, RICHARD A. JOHNSON, of Newnan, in the county of Coweta and State of Georgia, have invented certain new and useful Improvements in Hand Seed-Planters and Fertilizer-Distributers; and I do hereby declare the following to be a full, clear, and exact description of the invention, such as will enable others skilled in the art to which it pertains to make and use it, reference being had to the accompanying drawings, which form part of this specification.

My invention relates to an improvement in hand seed-planters and fertilizer-distributers; and it consists in the combination of a suitable box, in which is journaled a suitable shaft, with a movable tube, which is loosely attached to the bottom of the box, so that the tube can be moved in any direction while the operator walks along on the side of the furrow.

The object of my invention is to provide a planter which can be attached to the body, and which will allow the operator, as he walks along by the side of the furrow, to plant the seed and distribute the fertilizer by means of a movable tube in any direction.

Figure 1 is a front elevation of a planter embodying my invention complete. Fig. 2 is a longitudinal vertical section of the same. Fig. 3 is a plan view of the box.

A represents a suitable box, which will be made of sheet-iron or any other metal which may be preferred, and which has its two opposite sides vertical, or nearly so, while the bottom is made V-shaped, so as to move all of the cotton-seed and fertilizer toward the slot B, which is made through its center. To the upper edge of this box is secured, in any suitable manner, a bag, C, which may be of any desired depth, and which serves to hold a larger quantity of fertilizer or seed than can be done by the box alone.

Secured in any suitable manner to opposite ends of the bag and the box is the strap D, which is to be passed over the head and one of the arms, so as to support the box in position against one side, the whole of the weight then coming upon the opposite shoulder. In order to accommodate this box to the shape of the body, it is made curved, as shown, so that after being adjusted in any desired relation to the body it will remain in that position. This curve of the box is a very great help to the operator, for the box does not move back and forth as readily, and is much more easily managed, than would be the case if the side were made flat.

Passing horizontally through the box is the operating-shaft G, which is provided with a crank at one end, and with suitable devices, I, near its center, for forcing the seed and fertilizer from the box. This device I may consist either of a pointed wheel, which is to be revolved around, or else of a few spikes, which are attached to one side of the shaft, in which case the shaft will be reciprocated, so as to both force the seed and fertilizer from the box and to clear out the passage in case the machine should become clogged. Whether this device consists of a pointed wheel or of a series of spikes which are attached to one side of the shaft only, the effect produced is the same; also, secured to the shaft, upon each side of the wheel, are a series of devices, J, which serve to loosen the seed or fertilizer, or both, and force them down toward the slot in the bottom of the box, through which they are forced. In order to regulate the amount that shall be forced through the slot, an adjustable slide, L, is provided, which can be moved down, so as to shut off all supply from the box or to any desired degree. In order to enable this slide—which is placed upon one side of the bottom of the box, to cut off all feed, the shaft is made movable endwise, so that the feeding device J can be forced to one side of the slide, and thus let the slide close the slot entirely. Were the shaft not made movable endwise, the slide could only be adjusted down against one side of the wheel, and hence would leave the slot open upon its opposite side. Suitable bearings of any kind may be secured to the ends of the box where the shaft passes through when found necessary. The bottom of the box terminates in a chute, N, which has the hooks O secured to its side. Attached to the box, by means of suitable straps, wires, or cords, P, is the tube Q, which has the receiving-funnel R formed upon its top. This tube and funnel are formed separately from the box, so as to allow the tube to be freely moved in all directions as the operator walks along. The straps allow the tube a sufficient play to allow the seed and the fertilizer, as they are forced from the box by the movement of the shaft, to be conveyed to the front, the rear, or either side of the operator while he walks along upon the side of the furrow. Where the tube is made fast to the box, the operator must walk in the furrow, and he is then put to a great deal of inconvenience and trouble to move the end of the tube over obstructions of all kinds, which are so frequently encountered in the field. Where the tube is loosely attached to the box, however, the operator can walk where he pleases, and has no trouble in raising or moving the lower end of the tube, so as to pass over obstructions of all kinds. The amount of movement allowed the tube depends entirely upon the straps by which it is fastened to the lower part of the box.

The box and bag are filled with cotton-seed or fertilizer alone, or the two may be mixed together and fed together in the furrow at the same time. The box and bag hang suspended from the left side, and as the operator walks along he turns the crank with the right hand, while he guides the tube with his left. Should the operator be left-handed, the shaft may be removed and passed through from the opposite side, and thus be made left-handed.

Having thus described my invention, I claim—

1. A planter or fertilizer-distributer which is to be suspended from the body, in combination with a tube which is movably attached to the box, so that it can be moved from side to side independently thereof, substantially as shown.

2. In a hand-planter or fertilizer-distributer, the combination of the bag, the supporting-strap, the metallic box, the operating-shaft, and the loosely-swinging tube provided with a funnel, and suitable straps for attaching the tube to the box, substantially as set forth.

In testimony whereof I affix my signature in presence of two witnesses.

RICHARD A. JOHNSON.

Witnesses:
J. P. BREWSTER,
WILLIAM WELLS.